United States Patent [19]

Williams

[11] 4,284,086
[45] Aug. 18, 1981

[54] THRESHING AND SEPARATING APPARATUS

[76] Inventor: Dennis W. Williams, Rte. 1, Box 51, Toston, Mont. 59643

[21] Appl. No.: 189,123

[22] Filed: Sep. 22, 1980

[51] Int. Cl.³ .......................... A01F 7/06; A01F 12/18
[52] U.S. Cl. ........................... 130/27 M; 130/27 HF; 130/27 T; 130/30 R
[58] Field of Search ................ 130/27 M, 27 T, 27 Q, 130/27 HF, 30 R; 56/14.6

[56] References Cited

U.S. PATENT DOCUMENTS

| | | | |
|---|---|---|---|
| 1,887,817 | 11/1932 | Messinger | 130/27 M |
| 2,053,148 | 9/1936 | James | 130/27 T |
| 3,982,549 | 9/1976 | De Pauw et al. | 130/27 T |
| 4,198,802 | 4/1980 | Hengen et al. | 130/27 T |
| 4,222,395 | 9/1980 | Johnston et al. | 130/27 T |

Primary Examiner—Paul J. Hirsch
Attorney, Agent, or Firm—Rudolph L. Lowell; G. Brian Pingel

[57] ABSTRACT

A threshing unit is arranged in a concentrically spaced relation within a perforated rotatable grain separating cylinder. An elongated axially fluted impeller located below the threshing unit and within the separating cylinder accelerates the speed of travel of the threshed material to substantially the peripheral speed of the separating cylinder to reduce grain cracking and fracturing. The grain is centrifugally separated through the separating cylinder for removal by a clean grain auger located therebelow and the chaff is discharged by air flowing axially between the threshing unit and the separating cylinder. Tailings from the threshing unit are moved rearwardly along the inner peripheral surface of the separating cylinder for pickup and return to the threshing unit. A pair of oppositely arranged axially extended nozzle units direct concentrated blasts of air inwardly of the separating cylinder to lift the chaff and grain from the inner peripheral surface thereof whereby to continuously clean the cylinder perforations for clean grain travel therethrough.

8 Claims, 6 Drawing Figures

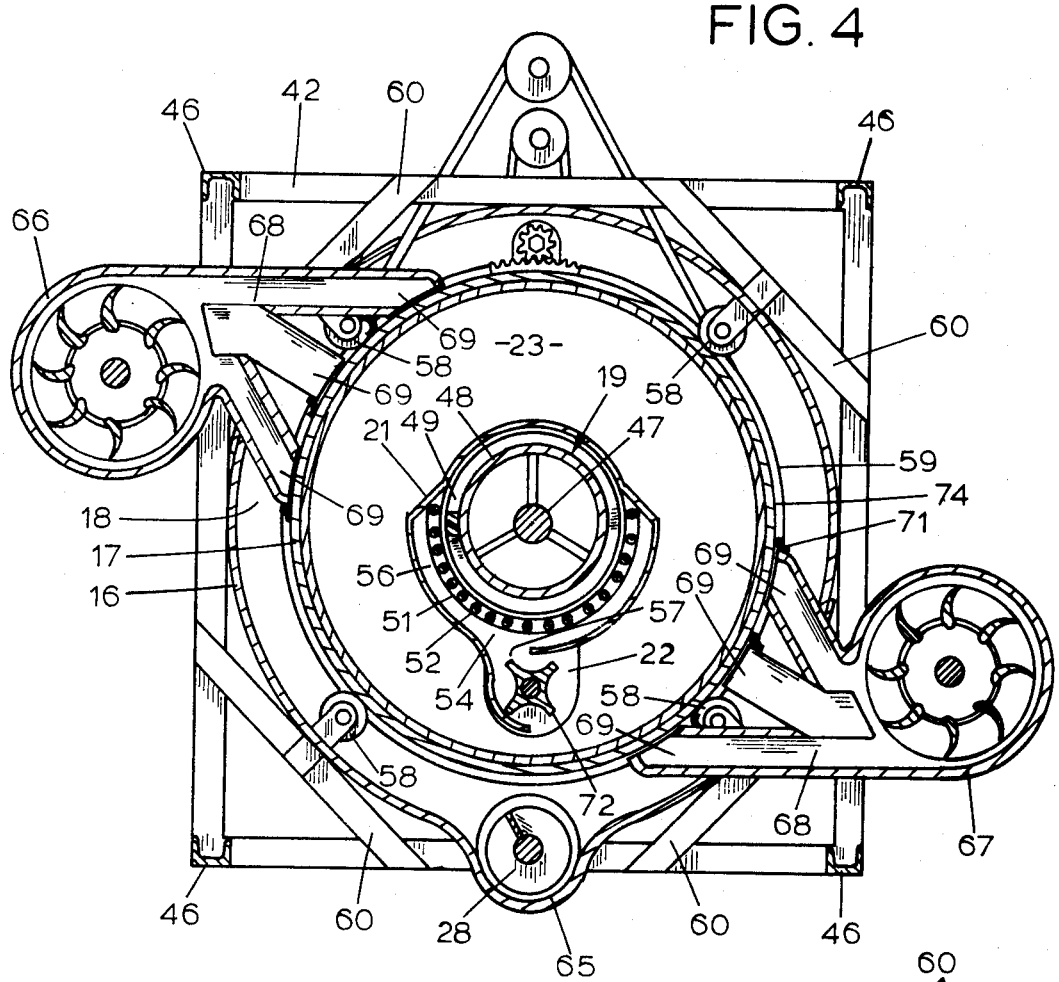
FIG. 4
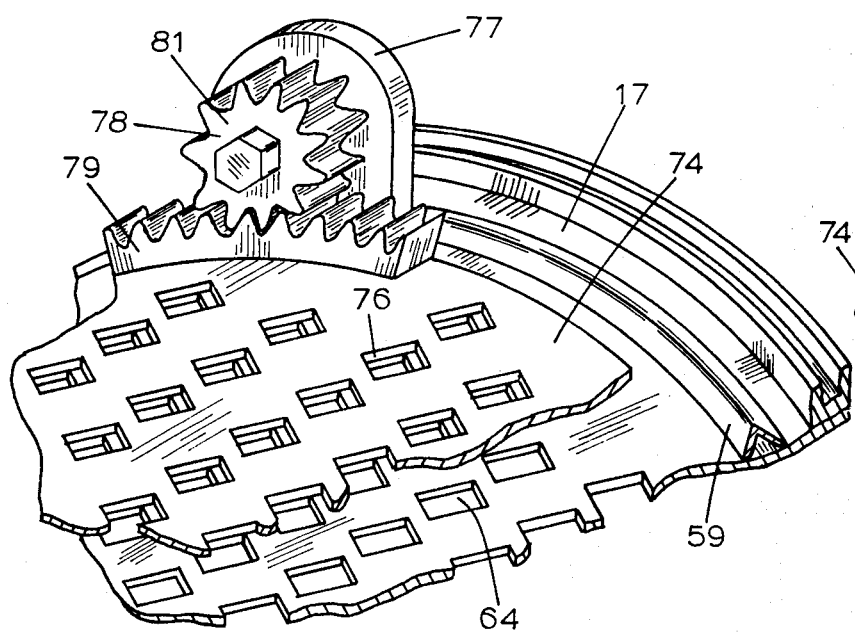
FIG. 5
FIG. 6

THRESHING AND SEPARATING APPARATUS

BACKGROUND OF THE INVENTION

Conventional apparatus for threshing grain generally includes a threshing unit that has a threshing cylinder operatively associated with the concave member or with a member that may have both a concave section and a grate section. The grain from the concave and grate sections is usually discharged onto a reciprocating chaffer sieve which passes grain and tailings therefrom to a reciprocating grain sieve. A clean grain auger picks up the clean grain for harvest and a tailings auger returns the tailings to the threshing unit. This general type threshing apparatus is disclosed in U.S. Pat. Nos. 3,537,460; 3,833,006 and 3,982,549. In these patents, grain separation is primarily dependent on the action of gravity so as to appreciably limit the capacity and cleaning efficiency of the threshing apparatus.

To more readily get rid of chaff from the threshed material, air under pressure has been utilized in combination with a threshing unit as exemplified by the disclosures of U.S. Pat. Nos. 1,226,865; 1,184,999; 2,053,148 and 2,811,158. In the separation of grain from the threshed material, centrifugal action has been utilized in the threshing mechanisms shown in U.S. Pat. No. 1,887,817, which also shows the use of air for removing chaff. In U.S. Pat. No. 3,425,423 the chaff is removed by an flow and, additionally, a blast of air is utilized with a rotatable separating screen tube to dislodge from the top portion of the inner peripheral surface of the tube any material which does not drop by the action of gravity during rotation of the screen tube.

Although pressurized air for chaff removal, grain separating cylinders that may be stationary or rotatably or reciprocally movable and an air blast acting on separating cylinders have been used in various combinations, the resultant threshing mechanisms have been inherently incapable of operating at a continuous high capacity with a sustained and efficient grain separating action.

SUMMARY OF THE INVENTION

The threshing apparatus is of a compact and economical construction and includes rotatable operating members for the purpose of substantially reducing vibration concurrently with providing an efficient and high capacity grain separation. The threshed material from the threshing unit drops into a receiving chamber for accelerated delivery into a rotatable perforated separating cylinder which separates the grain by the action of centrifugal force. The receiving chamber and the separating cylinder are coextensive in length with the threshing unit so that the separating action is continuous over the entire peripheral surface of the separating cylinder. The flow of pressurized air inwardly of the perforated separating cylinder and axially of the receiving chamber carries chaff for direct discharge from the machine. The tailings travel axially of the threshing unit for discharge from the outlet end thereof for return to the threshing unit inlet. A pair of diametrically opposed air nozzle units which extend axially of and to the outside of the separating cylinder over its full length deliver concentrated blasts of air inwardly of the separating cylinder to lift and agitate material that is held against the inner peripheral surface of the cylinder by centrifugal force. This lifting and agitating action maintains the cylinder perforations unobstructed and open over substantially the full peripheral area of the separating cylinder so as to assure a constant travel of grain therethrough. With the threshing unit, receiving chamber and separating cylinder being of substantially equal length, the chaff removal and grain separation takes place over the complete length of the threshing unit. As a result, the easy to thresh grain is initially separated and the hard to thresh grain is progressively separated as it travels through the apparatus. The pneumatic areas over which the threshed material travels during the separation process are not only relatively large but are compactly arranged so that the threshing apparatus is readily adapted for use with existing harvesting equipment. The chaff removal and grain separation takes place continuously and over relatively large operating areas without the utilization of gravity action, deflecting plates or circuitous material flow paths, all of which have a tendency to impede a free flow or travel of the threshed material for separation and removal from the apparatus.

DESCRIPTION OF THE DRAWINGS

FIG. 4 is an enlarged sectional view taken substantially along the line 4—4 in FIG. 3;

FIG. 5 is an enlarged detail fragmentary perspective view of a perforation adjusting mechanism for the separating cylinder which is shown generally in FIG. 4; and FIG. 6 is an enlarged detail sectional view taken along the line 6—6 in FIG. 2.

DESCRIPTION OF THE INVENTION

Figure 1:
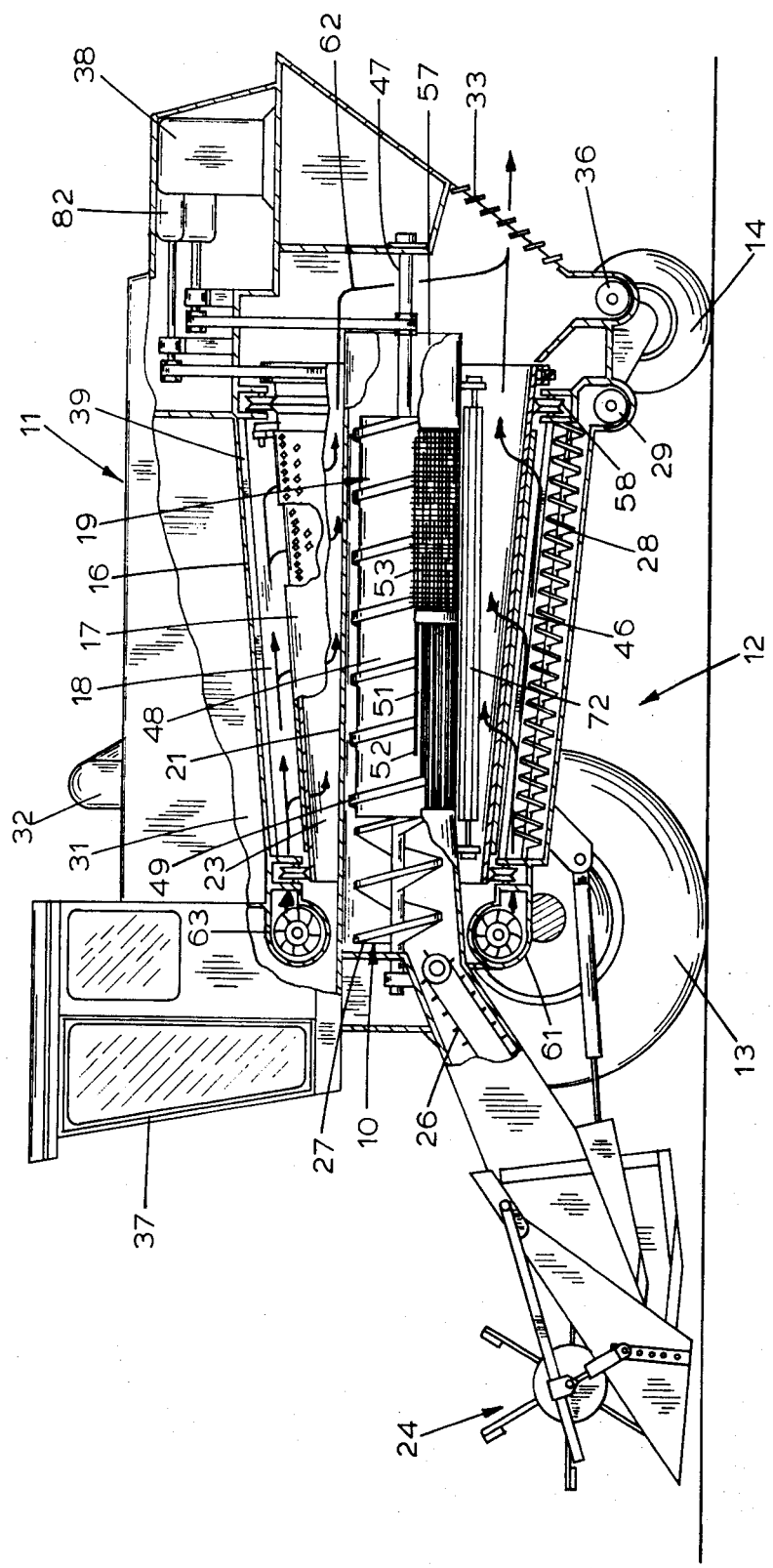
FIG. 1 is a side elevational view of a combine that includes the thresher apparatus of this invention with some parts broken away and other parts shown in section for the purpose of more clearly illustrating the construction thereof.

Referring to the drawings, the threshing apparatus of this invention, indicated generally at 10 in FIG. 1, is shown in assembly relation with a combine 11 having a chassis 12 with front traction wheels 13 and steerable rear wheels 14. The apparatus 10 is enclosed by a housing member 16 of a generally cylindrical tapered shape. Concentrically positioned in a spaced relation within the housing 16 is a tapered rotatable separating cylinder 17 with the space between the housing 16 and separating cylinder 17 defining a clean grain collecting chamber 18. Within the separating cylinder 17 and in a concentrically spaced relation therewith is a threshing unit 19 that is enclosed by a shroud or enclosing housing 21 having an axially extended bottom outlet 22. The space 23 between the enclosure 21 and the separating cylinder 17 forms a chamber 23 for receiving threshed grain from the threshing unit 19.

The material to be threshed is cut in a usual manner by a cutting mechanism, shown generally at 24, with the cut material being carried by a conveyor 26 to a feed auger 27 that moves the cut material into the threshing unit 19. On being threshed, the material enters the receiving chamber 23 and drops onto the rotating separating cylinder 17 for centrifugal separation of the clean grain from the threshed grain material. The clean grain, on passing through the separating cylinder 17 is discharged into the collecting chamber 18 from where it is moved by an auger 28 into a clean grain auger 29 for delivery into a storage bin 31 of the combine from where it is unloaded by an auger 32. The chaff is discharged from the receiving chamber through an outlet 33 at the rear end of the combine and tailings from the threshing unit 19 are picked up by a tailing auger 36 and returned in a suitable manner to the threshing unit 19 for further threshing action.

An operator's cab 37 having controls for the operation of the combine 11 and threshing apparatus 10 is mounted at the forward end of the chassis 12. The power source of the combine and theshing apparatus is an engine 38 located adjacent the rear end of the combine.

Figure 3:
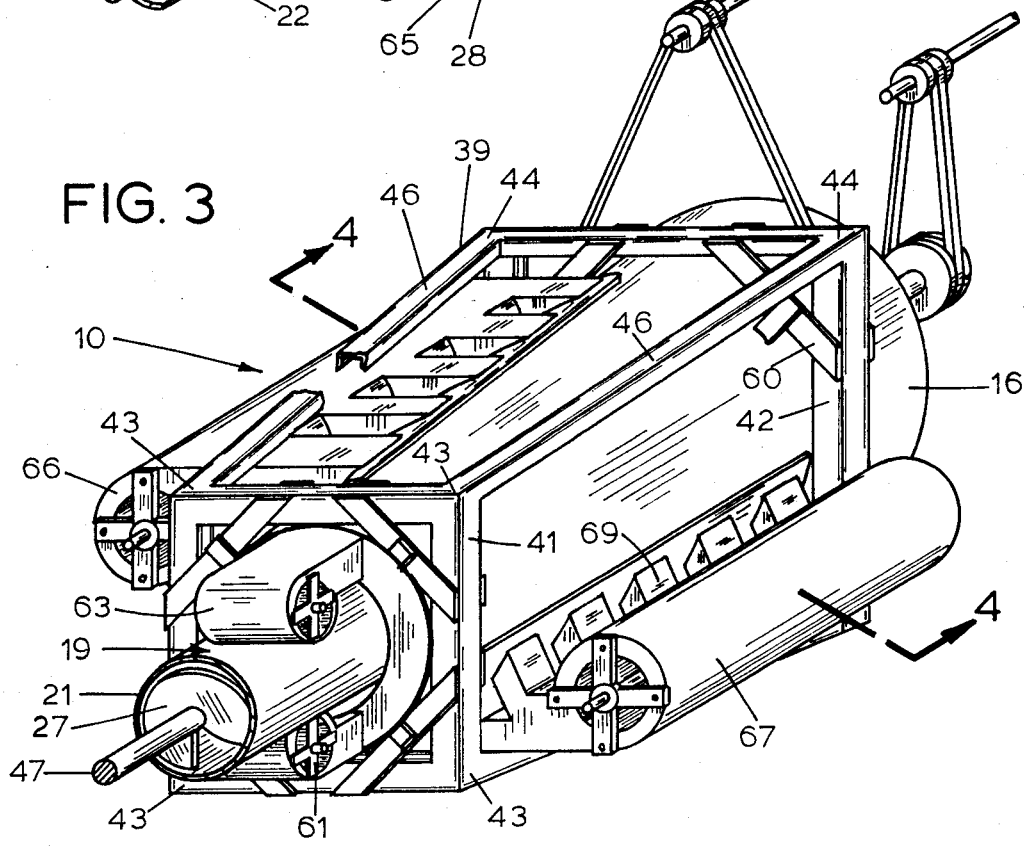
FIG. 3 is an enlarged perspective view with parts broken away showing the assembly relation of the supporting frame for the relatively rotatable threshing cylinder and separating cylinder.

The threshing apparatus 10 includes an elongated open frame structure 39 (FIGS. 1 and 3) suitably mounted in a fore and aft direction on the combine chassis 12 and including a pair of longitudinally spaced upright end frames 41 and 42. Each end frame is of a substantially square shape in side elevation with the end frame 41 smaller in size than the end frame 42 and which end frames hereinafter will be referred to as a front upright frame and a rear upright frame, respectively. The frames 41 and 42 are interconnected at opposite corner portions 43 and 44 thereof, respectively, by longitudinal side frame members 46.

The threshing unit 19 is arranged within the confines of the frame structure 39 and includes a shaft 47 extended longitudinally of and through the frame structure 39 for rotatable support in a suitable manner on the combine chassis 12. Supported on the shaft 47 for rotation therewith is a threshing cylinder 48 that has a rub or rasp bar 49 helically wrapped about its outer peripheral surface. Operatively associated with the threshing cylinder 48 and mounted on the frame 39 in a concentrically spaced relation about the threshing cylinder 48 is a combination concave and separating grate member 51 comprised of a front concave section 52 and an adjacent rear separating grate section 53. As shown in FIG. 4, the concave section 52 and separating grate section 53 extend about one hundred and eighty degrees about the periphery of the threshing cylinder 48 and in continuous operative association with the threshing cylinder over the axial length of the threshing unit. The space between the threshing cylinder 48 and the combination member 51 thus defines a threshing zone 54 that has an inlet 56 and an outlet 57.

The separating cylinder 17 is positioned within the dimensional confines of the frame 39 (FIGS. 1 and 4) and is rotatably supported on rollers 58, with a roller 58 being mounted on corner members 60 extended across each corner portion 43 and 44 of the end frames 41 and 42. The separating cylinder 17 (FIG. 6) is provided with a circumferential guide track 59 for coacting rolling engagement with a corresponding set of rollers 58 on an end frame 41 and 42. It is seen, therefore, that the receiving chamber 23 is coextensive in axial length with the threshing unit 19 so as to receive threshed grain material from the outlet 22 over the full length of such outlet for action by the separating cylinder.

As previously mentioned, the separating cylinder 17 is enclosed within the housing 16. Thus, as shown in FIGS. 1 and 4, the conveying auger 28 is located within an axially extended casing or pocket 65 formed in the lower side of the clean grain collecting chamber 18 and moves grain collected at such lower side into the clean grain auger 29. To efficiently thresh grain material at a high volume rate, the clean grain must be separated from the threshed material at a rate equal to or greater than the rate at which the cut grain material is supplied to the thresher apparatus. It is thus necessary that the grain separating means be maintained unobstructed and that the chaff and tailings be efficiently removed.

Since the threshing operation is continuous over the axial length of the threshing unit 16, it is apparent that the easy to thresh grain will be initially separated and that the threshing operation will proceed progressively along the axial length of the threshing unit to act on the harder to thresh grain. Chaff and threshed material is thus introduced into the receiving chamber 23 concurrently with the threshed grain.

To continuously remove the chaff and light material from the receiving chamber 23, the threshing apparatus is provided with a pair of fans 62 and 61 (FIGS. 1 and 3) of a blade or squirrel cage type, and arranged in a vertically spaced relation within the housing 16 at positions forwardly of the threshing unit 19. The fans 63 and 61 supply air under pressure into the forward end of the collecting chamber 18. As indicated by the arrows 62 in FIG. 1, the air is initially introduced into the collecting chamber 18 and then travels through the perforated separating cylinder 17 for travel axially of the receiving chamber 23. During such axial flow, chaff and light material is picked up by or entrained in the air for travel therewith outwardly from the receiving chamber 23 for discharge from the machine at the outlet 33.

Figure 2:
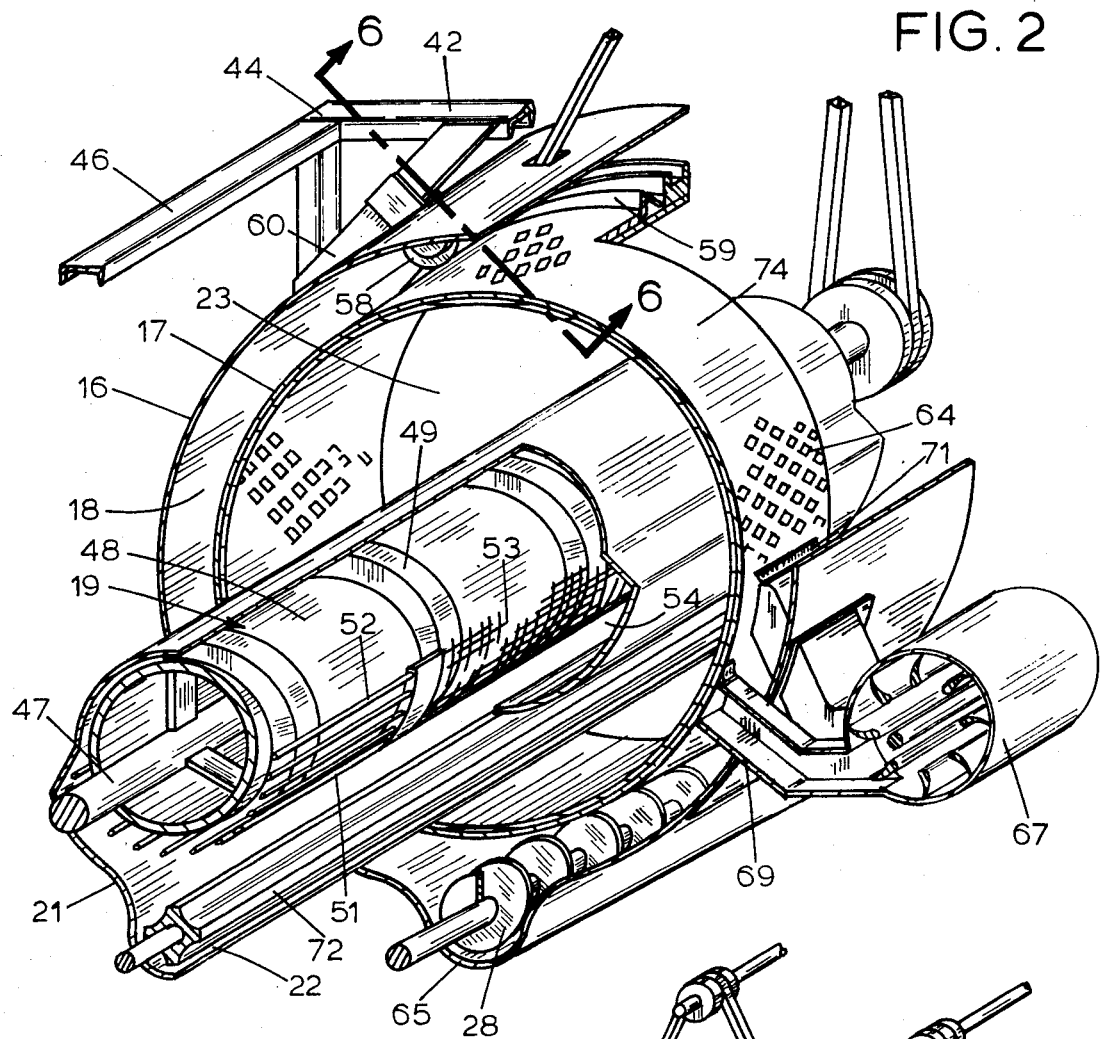
FIG. 2 is an enlarged perspective view of the rear portion of the thresher apparatus showing the assembly relation of the thresher unit with the perforated rotatable separating cylinder.

The perforations 64 in the separating cylinder 17 (FIGS. 2, 3 and 4) are continuously maintained open to permit an unobstructed passage therethrough of clean grain by means including a pair of fans 66 and 67 suitably mounted on the frame 39 to opposite sides of the threshing apparatus 10. Each fan 66 and 67 (FIG. 4) extends axially over the full length of the threshing unit 19 and has an outlet 68 terminating in a plurality of discharge nozzles 69, illustrated in FIG. 4 as arranged in three rows extended axially of and in a spaced relation circumferentially of the separating cylinder 17.

In the operation of the threshing apparatus, the threshed material from the threshing unit 19 on entering the receiving chamber 23 drops onto the inner peripheral surface of the rotating separating cylinder 17. The grain in the threshed material is moved outwardly of the separating cylinder and through the perforations 64 by the action of centrifugal force. This centrifugal force also tends to hold threshed material against the inner surface of the cylinder 17 so as to interfere with a free passage of grain through the perforations 64. To agitate and lift such material away from the separating cylinder the nozzles 69 project into the housing 16 and through the collecting chamber 18 for termination adjacent to the outer peripheral surface of the cylinder 17. High velocity air from the fans 66 and 67 is thus introduced directly at the perforations 64 so that on rotation of the cylinder 17, the threshed material on the inner surface thereof is continuously lifted and agitated. Chaff and light material thus blown inwardly of the receiving chamber 23 is picked up by the air flow supplied by the fans 63 and 61 for discharge at the outlet 33. To reduce interference with the air blasts from the nozzles 69, by air currents generated by the rotation of the cylinder 17, the leading side of each nozzle 69 is provided with what might be called a brush seal 71 having riding contact with the outer periphery of an adjustable outer cylinder 74 associated with the separating cylinder 17.

It will be seen that threshed grain falling into the receiving chamber 23 from the outlet 22 of the threshing zone 54 falls directly onto the rotating separating cylinder 17 for immediate impact and acceleration. Since this impact tends to fracture or crack the grain, the outlet 22 is provided with an axially extended impeller 72 rotatable at a speed to move the threshed material from the outlet 22 at a linear speed substantially equal to the peripheral speed of the cylinder 17. The grain passing through the cylinder perforations 64 and into the collecting chamber 18 is accumulated in the pocket 65 and conveyed by the auger 28 to the clean auger 29.

Tailings or heavy heads of grain that travel through the threshing zone 54 are discharged from the threshing zone outlet 57 into the tailing auger 36 for re-entry, in any suitable manner, to the feed auger 27. As shown in FIG. 1, such material moves downwardly through the air flow produced by the fans 63 and 61. Thus, any chaff or light material within the tailings will be carried away through the discharge outlet 33. The tapered cylindrical shape of the threshing unit 19 and separating cylinder 17 tends to maintain a free flow of material axially thereof by virtue of the progressively increasing peripheral surfaces of such members.

To accommodate the combining of grains of different kinds and size, the separating cylinder 17 (FIGS. 4 and 5) is associated with an outer adjustable perforated cylinder 74 formed with perforations 76 of a size and shape and relative spacing corresponding in all respects to the perforations 64 in the cylinder 17.

The cylinder 17 is provided at each end thereof with a radially extended bearing plate 77 (FIG. 5) for rotatably supporting a pinion gear 78 for operative meshing engagement with a gear rack 79 carried at each end of the adjustable cylinder 74. Although only one gear and rack assembly is illustrated in FIGS. 4 and 5, it is to be understood that such assemblies are arranged opposite each other and in axial alignment with the gear 78 being adjustable on rotation of the shaft 81 to move the perforations 76 relative to the perforations 64 between full open and full closed positions therefor. An adjusted position of the cylinder 74 is maintained by the gear assemblies 78 and 79. It is to be understood that the nozzles 69 extend between the gear tracks 79.

As shown in FIG. 1, the threshing unit 19 and the separating cylinder 17 are operated from the power unit 38 through a gear unit indicated generally at 82, for operation at relative rotational speeds. It is contemplated that such relative rotation be variable to provide for the most efficient harvesting of the grain material to be threshed.

Although the invention has been described with respect to a preferred embodiment thereof, it is to be understood that it is not to be so limited since changes and modifications can be made therein which are within the full intended scope of this invention as defined by the appended claims.

I claim:

1. Apparatus for threshing a grain material and separating the threshed grain from the residual grain material comprising:
   (a) an elongated supporting frame,
   (b) a threshing unit including a rotatable threshing cylinder and an associated combination concave and grate member mounted on said frame to form with the threshing cylinder a threshing zone having an inlet and an outlet,
   (c) means for supplying the grain material to be threshed into the inlet of said threshing zone,
   (d) a shroud on said frame enclosing said threshing unit and having an outlet extended axially of said threshing cylinder,
   (e) a rotatable grain separating cylinder having perforations in the peripheral surface thereof,
   (f) means for rotatably supporting said separating cylinder on said frame and about said shroud in a coaxial relation with said threshing cylinder to form with said shroud a chamber for receiving threshed material from said axially extended outlet for rotation with said separating cylinder, with the grain rotatable with said separating cylinder being moved by centrifugal force through the perforations therein,
   (g) means for agitating the threshed material rotating with said separating cylinder to maintain open the perforations therein,
   (h) means for removing chaff and light material from said receiving chamber, and
   (i) means for collecting and removing the clean grain discharged from the perforations in said separating cylinder.

2. The apparatus for threshing grain according to claim 1, including:
   (a) means for moving the threshed grain from said axially extended outlet into said receiving chamber at a linear speed substantially equal to the peripheral speed of the separating cylinder.

3. The apparatus for threshing grain according to claim 2, wherein:
   (a) said moving means includes an elongated impeller means extended axially of the threshing unit, and
   (b) means for mounting said impeller means on the frame for rotation within the outlet of said shroud.

4. The apparatus for threshing grain according to claim 1 including:
   (a) an adjustable cylinder for receiving the separating cylinder therein, said adjustable cylinder coextensive in length with the separating cylinder and having perforations in the peripheral surface thereof of a size and in a spaced relation for mating registration with the perforations in the separating cylinder, and
   (b) coacting means on the separating cylinder and adjustable cylinder for adjustably rotating the adjustable cylinder circumferentially relative to the separating cylinder to vary the effective size of the perforations in the separating cylinder and for locking the adjustable cylinder for rotation with the separating cylinder at a circumferentially adjusted position therefor.

5. The apparatus for threshing grain material according to claim 1 wherein:
   (a) said agitating means includes a pair of fan units mounted on said frame to opposite sides of said separating cylinder, each fan unit having an outlet portion extended axially over substantially the axial length of the separating cylinder for directing air against the outer peripheral surface of the separating cylinder for travel inwardly thereof through said perforations.

6. The apparatus for threshing grain material according to claim 5 wherein:

(a) each outlet portion includes nozzle means extended axially of the separating cylinder having terminal ends closely adjacent the outer peripheral surface of said separating cylinder, for the discharge of high velocity air flow through said perforations.

7. The apparatus for threshing grain material according to claim 6 wherein:

(a) said means for collecting and removing the clean grain includes a housing mounted on said frame for enclosing said separating cylinder having a clean grain collecting section in the lower portion thereof extended axially of the separating cylinder, (b) said nozzle means projected into said housing, and (c) means on the nozzle means for deflecting air moved by the separating cylinder in the direction of rotation thereof away from the terminal end of said nozzle means.

8. The apparatus for threshing grain material according to claim 7 including:

(a) means for supplying air under pressure into said housing adjacent the forward end of the separating cylinder for axial flow through the separating cylinder to remove chaff from the threshed grain material within the receiving chamber, and (b) means for removing residual threshed material from the outlet of the threshing zone for return to the inlet thereof.

\* \* \* \* \*